United States Patent
Kwon et al.

(10) Patent No.: US 9,892,277 B2
(45) Date of Patent: Feb. 13, 2018

(54) DEVICE AND METHOD FOR ENCODING DATA COLUMN

(71) Applicant: FASOO.COM CO., LTD., Seoul (KR)

(72) Inventors: Oh-Seung Kwon, Yongin-si (KR); Woo-Seok Kwon, Seoul (KR)

(73) Assignee: Fasoo.com Co., Ltd. (KR)

( * ) Notice: Subject to any disclaimer, the term of this patent is extended or adjusted under 35 U.S.C. 154(b) by 128 days.

(21) Appl. No.: 15/026,378

(22) PCT Filed: Sep. 30, 2014

(86) PCT No.: PCT/KR2014/009187
§ 371 (c)(1),
(2) Date: Mar. 31, 2016

(87) PCT Pub. No.: WO2015/050361
PCT Pub. Date: Apr. 9, 2015

(65) Prior Publication Data
US 2016/0246988 A1 Aug. 25, 2016

(30) Foreign Application Priority Data
Oct. 1, 2013 (KR) .................. 10-2013-0117242

(51) Int. Cl.
*G06F 21/62* (2013.01)
*G06F 11/14* (2006.01)
*G06F 17/30* (2006.01)

(52) U.S. Cl.
CPC ...... *G06F 21/6227* (2013.01); *G06F 11/1451* (2013.01); *G06F 17/30377* (2013.01);
(Continued)

(58) Field of Classification Search
CPC .................................................. G06F 21/6227
See application file for complete search history.

(56) References Cited

U.S. PATENT DOCUMENTS 5,857,088 A * 1/1999 Keith .................. G06F 9/30072
341/65
2004/0170201 A1* 9/2004 Kubo ................ H03M 13/2721
370/535

(Continued)

FOREIGN PATENT DOCUMENTS

KR  1020010056176 A  7/2001
KR  1020060087103 A  8/2006

(Continued)

OTHER PUBLICATIONS

Ge et al.; Fast, Secure Encryption for Indexing in a Column-Oriented DBMS; Published in: Data Engineering, 2007. ICDE 2007. IEEE 23rd International Conference on; Date of Conference: Apr. 15-20, 2007; IEEE Xplore.*

(Continued)

*Primary Examiner* — Bradley Holder
(74) *Attorney, Agent, or Firm* — Schmeiser, Olsen & Watts LLP

(57) ABSTRACT

A device and a method for encoding a data column are disclosed. A schema inquiry unit inquires into a schema of an original table which is a data table for performing encoding in a database in which a plurality of data tables are stored. A backup performing unit generates schema information of a backup table on the basis of the schema of the original table, generates a backup table by using the schema information of the backup table so as to copy data of the original table into the backup table, changes the original table by adding a backup column to the original table, and inactivates constraint conditions included in the changed original table so as to copy original columns included in the changed original table into the backup column. An encoding unit encodes data of an encoding target column, a column in which encoding is to be performed in the changed original table, and enters the data in each field of the original (Continued)

columns of the changed original table. Then, when the encoding for the data of the encoding target column is completed, the backup performing unit deletes the backup column from the changed original table and activates the constraint conditions.

13 Claims, 2 Drawing Sheets

(52) U.S. Cl.
CPC .... *G06F 17/30477* (2013.01); *G06F 21/6245* (2013.01); *G06F 2201/80* (2013.01); *G06F 2201/805* (2013.01); *G06F 2201/84* (2013.01)

(56) References Cited

U.S. PATENT DOCUMENTS

| | | | |
|---|---|---|---|
| 2004/0255133 A1* | 12/2004 | Lei | G06F 21/6227 |
| | | | 713/193 |
| 2006/0053112 A1* | 3/2006 | Chitkara | G06F 17/30595 |
| 2006/0236104 A1* | 10/2006 | Wong | G06F 21/6227 |
| | | | 713/168 |
| 2008/0033960 A1* | 2/2008 | Banks | G06F 17/30595 |
| 2012/0143913 A1* | 6/2012 | Beier | H03M 7/40 |
| | | | 707/776 |
| 2013/0086377 A1* | 4/2013 | Cilfone | H04L 9/085 |
| | | | 713/156 |

FOREIGN PATENT DOCUMENTS

| | | |
|---|---|---|
| KR | 1020090067342 A | 6/2009 |
| KR | 1020110060674 A | 6/2011 |
| WO | 2015/050361 A1 | 4/2015 |

OTHER PUBLICATIONS

Puttaswamy et al.; Silverline: toward data confidentiality in storage-intensive cloud applications; Published in: Proceeding SOCC '11 Proceedings of the 2nd ACM Symposium on Cloud Computing; Article No. 10; Cascais, Portugal; Oct. 26-28, 2011; ACM Digital Library.*

International Search Report for PCT/KR2014/009187 from the Korean Intellectual Property Office. 7 pages.

* cited by examiner

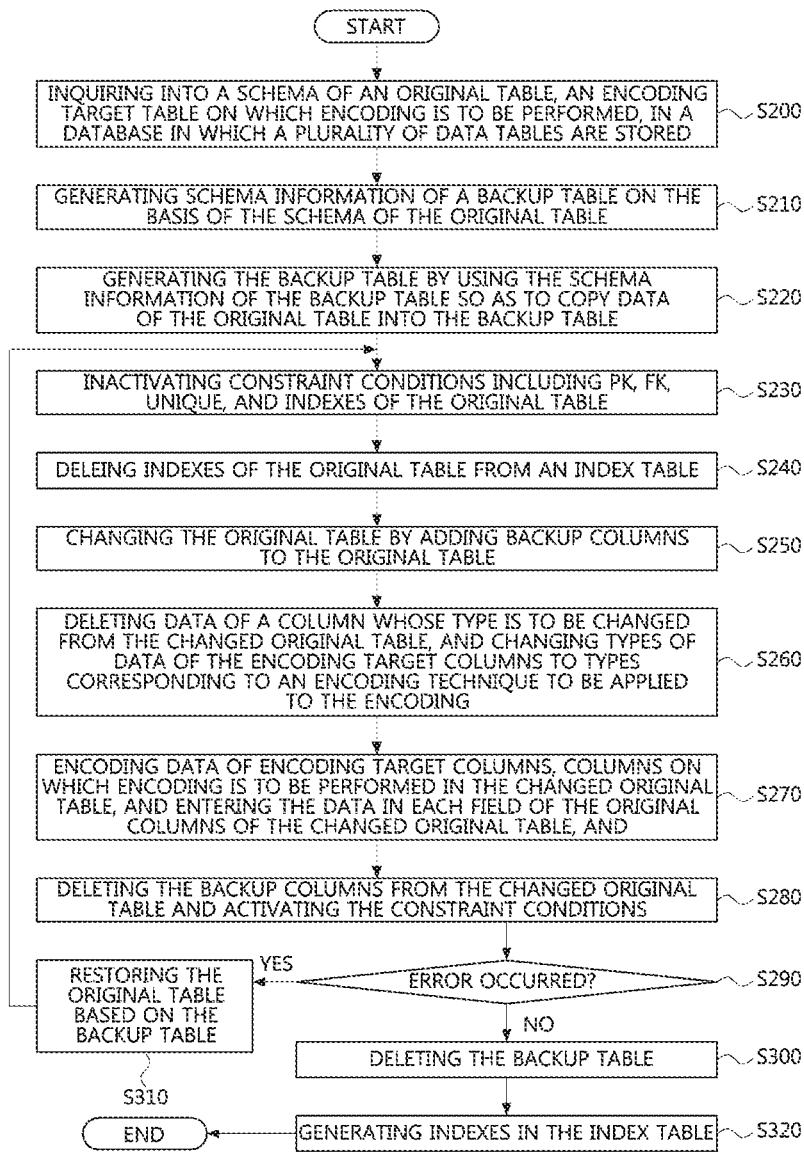

DEVICE AND METHOD FOR ENCODING DATA COLUMN

CROSS REFERENCE TO PRIOR APPLICATIONS

This application is a National Stage Patent Application of PCT International Patent Application No. PCT/KR2014/009187 filed on Sep. 30, 2014 under 35 U.S.C. 371, which claims priority under 35 U.S.C. 119 to Korean Patent Application No. 10-2013-0117242 filed on Oct. 1, 2013, which are all hereby incorporated by reference in their entirety.

TECHNICAL FIELD

The present disclosure relates to an apparatus and method for encoding a data column, and more particularly to an apparatus and method for encoding a data column in a table form.

BACKGROUND ART

The modern companies usually construct and manage a database storing customer information and personnel information in order to provide services to customers or manage inside operations. The resident registration numbers, addresses, telephone numbers, etc. of the customers and personnel are stored in such the database. According to advancement of hacking skills, leakage of such the important information may become a critical social problem. In order to resolve the above problem, the act on the protection of personal information was legislated, and the government requests companies to prepare measures for preventing the leakage of personal information owned by the companies according to the act. Accordingly, each company manages customer or personnel information in a database by encrypting them. In this case, target data to be encrypted are selected according to the act (i.e. the act on the protection of personal information).

Meanwhile, the database stores actual data such as resident registration numbers, addresses, telephone numbers, etc. together with indexes and constraint conditions (e.g. primary key (PK) and foreign key (FK)). In such the situation, a manager of the database selects target tables and target fields in the target tables for the encryption based on the act. Then, encryption on the target tables and the target fields is performed. However, in such the encryption procedure, conventional encryption techniques may make a problem that the encrypted tables collide with other relevant tables or a problem that relations between the encrypted tables and other relevant tables are destructed. Also, even after the encryption, inside information may be searched by using the indexes, or systems may be changed by using the indexes, whereby critical security risks can be caused.

A method for encrypting a data column, in which indexes of an encryption target column are deleted, the target column is encrypted, and indexes of the encrypted column are regenerated, was disclosed in Korean patent publication No. 2006-0087103. According to such the method for data column encryption, security can be strengthened when a data column for which indexes or PKs are configured is encrypted. However, since indexes of the target column are deleted before encryption, any error occurring during the encryption procedure may damage the original target column or cause data loss in the original target column. Also, since the encryption is performed with data properties of the table being maintained, data length changes according to applied encryption techniques cannot be coped with properly.

Disclosure

Technical Problem

The technical purpose of the present invention is to provide a method for data column encryption, which can be adapted to an encryption technique used for encryption on a data column, and cope with various error situations occurring in the encryption procedure.

Also, another technical purpose of the present invention is to provide a computer-readable recording medium storing a program for executing a method for data column encryption, which can be adapted to an encryption technique used for encryption on a data column, and cope with various error situations occurring in the encryption procedure.

Technical Solution

The present invention to achieve the above-described purpose provides a data column apparatus comprising a schema inquiry unit inquiring into a schema of an original table, an encoding target table on which encoding is to be performed, in a database in which a plurality of data tables are stored, a backup performing unit generating schema information of a backup table on the basis of the schema of the original table, generating the backup table by using the schema information of the backup table so as to copy data of the original table into the backup table, changing the original table by adding backup columns to the original table, and inactivating constraint conditions included in the changed original table so as to copy original columns included in the changed original table into the backup columns; and an encoding unit encoding data of encoding target columns, columns on which encoding is to be performed in the changed original table, and entering the encode data in respective fields of the original columns of the changed original table. Also, the backup performing unit may delete the backup columns from the changed original table and activate the constraint conditions after the encoding for the data of the encoding target columns is completed.

The present invention to achieve the above-described purpose provides a data column encoding method comprising inquiring into a schema of an original table, an encoding target table on which encoding is to be performed, in a database in which a plurality of data tables are stored; generating schema information of a backup table on the basis of the schema of the original table, and generating the backup table by using the schema information of the backup table so as to copy data of the original table into the backup table; changing the original table by adding backup columns to the original table, and inactivating constraint conditions included in the changed original table so as to copy original columns included in the changed original table into the backup columns; encoding data of encoding target columns, columns on which encoding is to be performed in the changed original table, and entering the encoded data in respective fields of the original columns of the changed original table, and deleting the backup columns from the changed original table and activating the constraint conditions after the encoding for the data of the encoding target columns is completed.

Advantageous Effects

Using the data column encoding apparatus and method according to the present invention, a backup table for an original table is generated, and then a data column is encrypted. Meanwhile, since an index column of the original table is not deleted, reliability of the encryption procedure can be enhanced. Also, since encryption target columns are encrypted after data types of the encryption target columns are changed, the apparatus and method according to the present invention can adaptively cope with various encryption techniques which can be used for encryption of the encryption target columns.

DESCRIPTION OF DRAWINGS

FIG. 2 is a flow chart to illustrate a preferred exemplary embodiment of a data column encryption method according to the present invention.

BEST MODE

Figure 1:
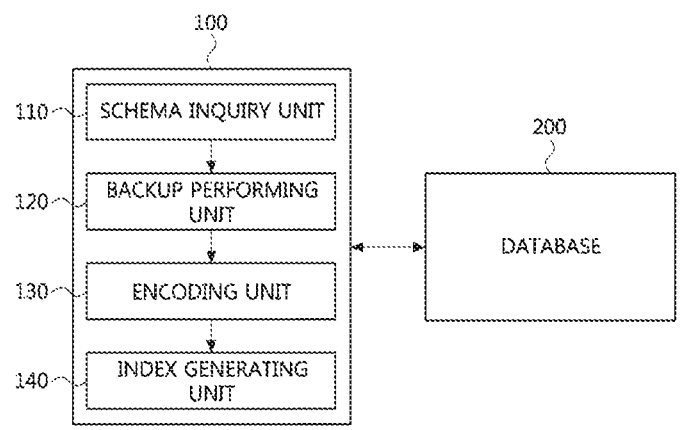
FIG. 1 is a view illustrating a data column encoding apparatus according to the present invention.

Hereinafter, preferred exemplary embodiments for a data column encoding apparatus and method according to the present invention will be explained in detail by referring to accompanying figures.

FIG. 1 is a view illustrating a data column encoding apparatus according to the present invention.

Referring to FIG. 1, the data column encoding apparatus 100 according to the present invention may comprise a schema inquiry unit 110, a backup performing unit 120, an encoding unit 130, and an index generating unit 140.

The schema inquiry unit 110 may inquire into a schema of an original table, an encoding target table on which encoding is to be performed, in a database in which a plurality of data tables are stored. Such the schema inquiry may include a table script inquiry, an index script inquiry, and a constraint condition inquiry. In this instance, the schema inquiry unit 110 may store a result of the schema inquiry in a storage (not depicted) equipped within the data column encoding apparatus 100. The schema of the original table may be previously stored in a database 200, or may be generated by the schema inquiry unit 110 from the original table. In the following tables 1 to 3, examples of schema information, data, and database indexes of the original table are represented. The examples are for a case in which the original table is a division information table for storing division codes and division names of a specific company. Also, in the following tables 4 to 6, examples of schema information, data, and database indexes of the original table are represented. The examples are for a case in which the original table is a personal information table for storing personal information of a specific company.

TABLE 1

| Column Name | ID | PK | Null? | Data Type | Default | Histogram | Num Identifier |
|---|---|---|---|---|---|---|---|
| Division Name | 2 | | Y | VARCHAR2 (50 bytes) | | None | |
| Division Code | 1 | 1 | N | CHAR (1 byte) | | None | |

TABLE 2

| Division Code | Division Name |
|---|---|
| 1 | Development team |
| 2 | Support team |

TABLE 3

| Index | Schema | Table schema | Table Name | Table Space |
|---|---|---|---|---|
| DEPT_PK | EXAMPLE | EXAMPLE | DEPT | USERS |
| SYS_IL0000095871C00036$$ | EXAMPLE | EXAMPLE | TOAD_PLAN_TABLE | USERS |

TABLE 4

| Column Name | ID | PK | Null? | Data Type | Default | Histogram | Num Identifier |
|---|---|---|---|---|---|---|---|
| Division Code | 2 | | Y | CHAR (1 byte) | 1 | None | |
| Identifier | 1 | 1 | N | INTEGER | | None | |
| Telephone Number | 4 | | Y | VARCHAR2 (13 bytes) | | None | |
| Resident Registration Number | 3 | | Y | VARCHAR2 (14 bytes) | | None | |

TABLE 5

| Identifier | Division Code | Resident Registration Number | Telephone Number |
|---|---|---|---|
| 1000 | 1 | 820101-1234567 | 010-1234-5678 |
| 1001 | 2 | 830201-2345678 | 010-2345-6789 |
| 1002 | 1 | 840301-1234567 | 010-3456-7890 |

TABLE 6

| Index | Schema | Table schema | Table Name | Table Space |
|---|---|---|---|---|
| DEPT_PK | EXAMPLE | EXAMPLE | DEPT | USERS |
| SYS_C0019951 | EXAMPLE | EXAMPLE | EMPLOYEE | USERS |
| SYS_C0019952 | EXAMPLE | EXAMPLE | EMPLYOEE | USERS |
| SYS_IL0000095871C00036$$ | EXAMPLE | EXAMPLE | TOAD_PLAN | USERS_TABLE |

The backup performing unit 120 may generate schema information of a backup table based on the inquired schema information of the original table. Also, the backup performing unit 120 may generate the backup table by using the generated schema information of the backup table, and copy data of the original table to the backup table. When the backup table is generated, database indexes for the backup table are generated. Here, the indexes starting with 'SYS' may be generated by the database 200, and the other indexes may be generated by the backup performing unit 120.

In the tables 7 and 8, indexes, which are generated by the database 200 after the backup of the division information table and after the backup of the division information table and the personnel information table, are represented.

TABLE 7

| Index | Schema | Table Schema | Table Name | Table |
|---|---|---|---|---|
| DEPT_BAK_PK | EXAMPLE | EXAMPLE | DEPT_BAK | USERS |
| DEPT_PK | EXAMPLE | EXAMPLE | DEPT | USERS |
| SYS_C0019951 | EXAMPLE | EXAMPLE | EMPLOYEE | USERS |
| SYS_C0019952 | EXAMPLE | EXAMPLE | EMPLOYEE | USERS |
| SYS_IL0000095871C00036$$ | EXAMPLE | EXAMPLE | TOAD_PLAN_TABLE | USERS |
| DEPT_BAK_PK | EXAMPLE | EXAMPLE | DEPT_BAK | USERS |
| DEPT_PK | EXAMPLE | EXAMPLE | DEPT | USERS |
| SYS_C0019951 | EXAMPLE | EXAMPLE | EMPLOYEE | USERS |
| SYS_C0019952 | EXAMPLE | EXAMPLE | EMPLOYEE | USERS |
| SYS_C0019955 | EXAMPLE | EXAMPLE | EMPLOYEE_BAK | USERS |
| SYS_C0019956 | EXAMPLE | EXAMPLE | EMPLOYEE_BAK | USERS |
| SYS_IL0000095871C00036$$ | EXAMPLE | EXAMPLE | TOAD_PLAN_TABLE | USERS |

After then, the backup performing unit 120 may inactivate constraint conditions including PK, FK, Unique, and indexes of the original table. The indexes staring with 'SYS_C', which are assigned by the database 200, may be automatically deleted by the database 200. In the table 9, the index table stored in the database 200 after deletion of the indexes staring with 'SYS_C' is represented.

TABLE 9

| Index | Schema | Table Schema | Table Name | Table |
|---|---|---|---|---|
| DEPT_BAK_PK | EXAMPLE | EXAMPLE | DEPT_BAK | USERS |
| SYS_C0019955 | EXAMPLE | EXAMPLE | EMPLOYEE_BAK | USERS |
| SYS_C0019956 | EXAMPLE | EXAMPLE | EMPLOYEE_BAK | USERS |
| SYS_IL0000095871C0036$$ | EXAMPLE | EXAMPLE | TOAD_PLAN_TABLE | USERS |

Then, the backup performing unit 120 may change the original table by adding backup columns to the original table, and copy values of a column whose type is to be changed among the original columns of the changed original table to the corresponding backup column. The following tables 10 and 11 respectively represent schema information of the division information table and personnel information after addition of the backup columns. Also, the following tables 12 and 13 respectively represent the division information table and the personnel information table after addition of the backup columns.

TABLE 10

| Column Name | ID | PK | Null? | Data Type | Default | Histogram | Num Identifier |
|---|---|---|---|---|---|---|---|
| Division Name | 2 | | Y | VARCHAR2 (50 bytes) | | None | |
| Division Code | 1 | 1 | N | CHAR (1 byte) | | None | |
| Division Code_BAK | 3 | | Y | CHAR (1 byte) | | None | |

TABLE 11

| Column Name | ID | PK | Null? | Data Type | Default | Histogram | Num Identifier |
|---|---|---|---|---|---|---|---|
| Division Code | 2 | | Y | CHAR (1 byte) | 1 | None | |

TABLE 11-continued

| Column Name | ID | PK | Null? | Data Type | Default | Histogram | Num Identifier |
|---|---|---|---|---|---|---|---|
| Division Code_BAK | 6 | | Y | CHAR (1 byte) | | None | |
| Identifier | 1 | 1 | N | INTEGER | | None | |
| Identifier_BAK | 5 | | | INTEGER | | None | |

TABLE 11-continued

| Column Name | ID | PK | Null? | Data Type | De-fault | Histogram | Num Identifier |
|---|---|---|---|---|---|---|---|
| Telephone Number | 4 | | Y | VARCHAR2 (13 bytes) | | None | |
| Telephone Number_BAK | 7 | | Y | VARCHAR2 (13 bytes) | | None | |
| Resident Registration Number | 3 | | Y | VARCHAR2 (14 bytes) | | None | |
| Resident Registration Number_BAK | 8 | | Y | VARCHAR2 (14 bytes) | | None | |

TABLE 12

| Division Code | Division Name | Division Code_BAK |
|---|---|---|
| 1 | Development team | 1 |
| 2 | Support team | 2 |

TABLE 13

| Identifier | Division Code | Resident Registration Number | Telephone Number | Identifier_BAK | Division Code_BAK | Resident Registration Number_BAK | Telephone Number_BAK |
|---|---|---|---|---|---|---|---|
| 1000 | 1 | 820101-1234567 | 010-1234-5678 | 1000 | 1 | 820101-1234567 | 010-1234-5678 |
| 1001 | 2 | 830201-2345678 | 010-2345-6789 | 1001 | 2 | 830201-2345678 | 010-2345-6789 |
| 1002 | 1 | 840301-1234567 | 010-3456-7890 | 1002 | 1 | 840301-1234567 | 010-3456-7890 |

Then, the backup performing unit 120 may delete data of columns whose types are changed from the changed original table. The reason is that data of columns whose types are changed should be deleted in order to change types of the columns. Since the division information table represented in the table 12 does not have columns whose types are changed, the division information table in the table 12 does not have columns whose data are deleted. However, in a case of the personnel information table represented in the table 13, since a type of the 'identifier' column is changed from INTEGER to CHAR, data of the 'identifier' column are deleted. Also, the backup performing unit 120 may change types of encryption target columns (e.g. 'identifier', 'division code', 'resident registration number', 'telephone number') among columns of the changed original table to types corresponding to an encryption technique to be performed on the encryption target columns. For example, if the encryption technique is a technique for encrypting encryption target data as data with a type of 24 bytes VARCHAR2 having 24 bytes length, the backup performing unit 120 may change data type of the encryption target columns to 24 bytes VARCHAR2, and record information on such the change in the schema table.

The encoding unit 130 may encode data of encoding target columns, columns on which encoding is to be performed in the changed original table, and entering the encoded data in each field of the original columns of the changed original table. In this instance, the encoding unit 130 may encode a default value when the default value is configured in the encoding target column. The encoding unit 130 may use any one or combination of various known encoding techniques in order to encode the encoding target columns. Since such the encoding techniques are well known to skilled persons pertaining to a technology domain according to the present invention, detail explanations on the encoding techniques are omitted. After the encoding unit 130 completes the encoding on the data in the encoding target columns, the backup performing unit 120 may delete the backup columns (i.e. 'Identifier_BAK', 'Division code_BAK', 'Telephone Number_BAK', and 'Resident Registration Number_BAK') from the changed original table, and activate the constraint conditions.

After completion of the encoding of the data of the encoding target columns, the index generating unit 140 may regenerate indexes in the index table. Since the indexes starting with 'SYS_C' have been automatically deleted by the database 200 at the inactivation of the constraint conditions, it is needed to regenerate the deleted indexes after completion of the encoding. In the above-explained exemplary embodiment, indexes corresponding to the 'identifier' and 'resident registration number' start with 'SYS_C', and thus the index generating unit 140 may regenerate indexes corresponding to the 'identifier' and 'resident registration number'. Also, for a function based index such as 'Division Code' and a domain index such as 'PK', indexes should be regenerated after the encoding of the data of the encoding target columns. On the other hand, since indexes based on names assigned by users are automatically regenerated by the database 200 when the constraint conditions are activated, the index generating unit 140 does not have to generate the indexes.

As stated above, after the encoding of the data in the changed original table is completed, the backup performing unit 120 may delete the backup table. If an error occurs during the procedure of encoding the changed original table, the original table is restored based on the backup table, and then the encoding procedure is performed again. Here, the encoding procedure on the changed original table may mean a whole procedure from the inactivation of the constraint conditions of the original table to the activation of the constraint conditions of the changed original table. If an error occurs in the encoding procedure, the original table is restored, and the encoding procedure is performed again.

FIG. 2 is a flow chart to illustrate a preferred exemplary embodiment of a data column encryption method according to the present invention.

Referring to FIG. 2, the schema inquiry unit 110 may inquire into a schema of an original table which is a data table on which encoding is to be performed in a database in which a plurality of data tables are stored (S200). Then, the backup performing unit 120 may generate schema information of a backup table on the basis of the schema of the original table (S210). Also, the backup performing unit 120 may generate the backup table by using the generated schema information of the backup table so as to copy data of the original table into the backup table (S220).

Then, the backup performing unit 120 may inactivate constraint conditions including PK, FK, Unique, and indexes of the original table (S230). In this instance, indexes starting with 'SYS_C', which are assigned by the database 200, may be deleted automatically by the database 200.

Then, the backup performing unit 120 may change the original table by adding backup columns to the original table (S240). Then, the backup performing unit 120 may copy values of columns whose types are to be changed, among columns of the original table corresponding to the added backup columns, to the backup columns (S250). Then, the backup performing unit 120 may delete data of the columns whose types to be changed from the changed original table, and change types of encoding target columns on which encoding is to be performed to types corresponding to an encoding technique to be applied (S260). Then, the encoding unit 130 may encodes data of the encoding target column, a column in which encoding is to be performed in the changed original table, and entering the data in each field of the original columns of the changed original table (S270). After the encoding unit 130 completes the encoding of the data of the encoding target column, the backup performing unit 120 may delete the backup columns from the changed original table, and activate the constraint conditions (S280).

If the encoding procedure is completed without any error (S290), the backup performing unit 120 may delete the backup table (S300), and the index generating unit 140 may regenerate indexes of the index table (S320) after completion of the encoding of the data in the encoding target column. On the contrary, if an error occurs in the encoding procedure (S290), the backup performing unit 120 may restore the original table based on the backup table (S310), and the steps from S230 are performed again. Here, the encoding procedure in the step S290 may mean a whole procedure from the deactivation of the constraint conditions of the original table in the step S230 to the activation of the constraint conditions of the changed original table in the step S280. Thus, if an error occurs in the procedure from the step S230 to the step S280, the step S310 may be performed. Also, the step S320 may be performed before the step S300.

The apparatuses and methods according to the present disclosure may be implemented as a program code recorded in a computer-readable recording medium. The computer-readable recording medium may include all types of storage devices on which computer-readable data can be stored. For example, the computer-readable recording medium may be read-only memory (ROM), random access memory (RAM), compact disc ROM (CD-ROM), magnetic tape, a floppy disc, an optical data storage device, etc. Also, a carrier wave (i.e., transmission through internet) may be included as the computer-readable recording medium. Also, the computer-readable recording medium may be distributed over computer systems connected through wire or wireless communication networks, and the computer-readable program code can be stored and executed in the distributive manner.

Although the preferred exemplary embodiments are illustrated and explained in the present specification, the present invention is not restricted to the above-described specific preferred exemplary embodiments, and it should be understood that various changes, substitutions and alterations may be made herein without departing from the scope of the invention.

The invention claimed is:

1. A data column encoding apparatus to provide data column encryption which can cope with various error situations comprising:
at least one hardware processor;
a schema inquiry unit, using the at least one hardware processor, inquiring into a schema of an original table, an encoding target table on which encoding is to be performed, in a database in which a plurality of data tables are stored, wherein the schema inquiry unit inquires into a table script, an index script, and a constraint condition script according to the original table;
a backup performing unit, using the at least one hardware processor, generating schema information of a backup table on the basis of the schema of the original table, generating the backup table by using the schema information of the backup table so as to copy data of the original table into the backup table, changing the original table by adding backup columns to the original table, and inactivating constraint conditions included in the changed original table so as to copy original columns included in the changed original table into the backup columns; and
an encoding unit, using the at least one hardware processor, encoding data of encoding target columns, columns on which encoding is to be performed in the changed original table, and entering the encoded data in respective fields of the original columns of the changed original table;
an index generating unit, using the at least one hardware processor, regenerating indexes deleted from the database when the constraint conditions are inactivated after the activation of the constraint conditions, wherein the index generating unit regenerates a function based index and a domain index after the activation of the constraint conditions,
wherein the backup performing unit deletes the backup columns from the changed original table and activates the constraint conditions after the encoding for the data of the encoding target columns is completed.

2. The apparatus according to claim 1, wherein the backup performing unit deletes data of a column whose type is to be changed from the changed original table, and changes types of data of the encoding target columns to types corresponding to an encoding technique to be applied to the encoding.

3. The apparatus according to claim 1, wherein the backup performing unit deletes data of a column whose type is to be changed from the changed original table, and changes types of data of the encoding target columns to types corresponding to an encoding technique to be applied to the encoding.

4. The apparatus according to claim 1, wherein the encoding unit encodes default values configured in the encoding target columns.

5. The apparatus according to claim 1, wherein the backup performing unit deletes the backup table after the encoding unit encodes data of the encoding target columns.

6. A data column encoding method to provide data column encryption which can cope with various error situations comprising the following steps performed by at least one hardware processor:
inquiring into a schema of an original table, an encoding target table on which encoding is to be performed, in a database in which a plurality of data tables are stored, wherein the inquiring inquires into a table script, an index script, and a constraint condition script according to the original table;
generating schema information of a backup table on the basis of the schema of the original table, and generating the backup table by using the schema information of the backup table so as to copy data of the original table into the backup table;
changing the original table by adding backup columns to the original table, and inactivating constraint conditions included in the changed original table so as to copy original columns included in the changed original table into the backup columns;

encoding data of encoding target columns, columns on which encoding is to be performed in the changed original table, and entering the encoded data in respective fields of the original columns of the changed original table;

deleting the backup columns from the changed original table and activating the constraint conditions after the encoding for the data of the encoding target columns is completed; and regenerating indexes deleted from the database when the constraint conditions are inactivated after the activation of the constraint conditions, wherein the generating indexes regenerates a function based index and a domain index after the activation of the constraint conditions.

7. The method according to claim 6, wherein data of a column whose type is to be changed from the changed original table are deleted, and types of data of the encoding target columns are changed to types corresponding to an encoding technique to be applied to the encoding.

8. The method according to claim 6, wherein, in the encoding, default values configured in the encoding target columns are encoded.

9. The method according to claim 6, wherein the backup table is deleted after the encoding of data of the encoding target columns is completed.

10. A computer program product to provide data column encryption which can cope with various error situations, embodied thereon a computer readable hardware storage device having computer readable program code stored therein, said program code containing instructions executable by one or more processors of a computer, said method comprising:

inquiring into a schema of an original table, an encoding target table on which encoding is to be performed, in a database in which a plurality of data tables are stored, wherein the inquiring inquires into a table script, an index script, and a constraint condition script according to the original table;

generating schema information of a backup table on the basis of the schema of the original table, and generating the backup table by using the schema information of the backup table so as to copy data of the original table into the backup table;

changing the original table by adding backup columns to the original table, and inactivating constraint conditions included in the changed original table so as to copy original columns included in the changed original table into the backup columns;

encoding data of encoding target columns, columns on which encoding is to be performed in the changed original table, and entering the encoded data in respective fields of the original columns of the changed original table, and;

deleting the backup columns from the changed original table and activating the constraint conditions after the encoding for the data of the encoding target columns is completed; and regenerating indexes deleted from the database when the constraint conditions are inactivated after the activation of the constraint conditions, wherein the generating indexes regenerates a function based index and a domain index after the activation of the constraint conditions.

11. The computer program product according to claim 10, wherein data of a column whose type is to be changed from the changed original table are deleted, and types of data of the encoding target columns are changed to types corresponding to an encoding technique to be applied to the encoding.

12. The computer program product according to claim 10, wherein, in the encoding, default values configured in the encoding target columns are encoded.

13. The computer program product according to claim 10, wherein the backup table is deleted after the encoding of data of the encoding target columns is completed.

* * * * *